(12) United States Patent
Shklyar et al.

(10) Patent No.: US 11,707,948 B2
(45) Date of Patent: Jul. 25, 2023

(54) SYSTEMS AND METHODS OF DETERMINING TREAD DEPTH

(71) Applicant: UVEYE LTD., Tel Aviv (IL)

(72) Inventors: Roman Shklyar, Holon (IL); Ilya Grinshpoun, Ramat-Gan (IL); Danny Grossman, Herzliya (IL); Ilia Shapiro, Rishon LeTsiyon (IL)

(73) Assignee: UVEYE LTD., Tel Aviv (IL)

( * ) Notice: Subject to any disclaimer, the term of this patent is extended or adjusted under 35 U.S.C. 154(b) by 321 days.

(21) Appl. No.: 17/039,765

(22) Filed: Sep. 30, 2020

(65) Prior Publication Data

US 2022/0097463 A1 Mar. 31, 2022

(51) Int. Cl.
*B60C 11/24* (2006.01)
*B60C 99/00* (2006.01)
(Continued)

(52) U.S. Cl.
CPC .......... *B60C 11/246* (2013.01); *B60C 99/006* (2013.01); *G01B 11/22* (2013.01); *G01M 17/02* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0462; B60C 23/0411; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354;
(Continued)

(56) References Cited

U.S. PATENT DOCUMENTS 9,805,697 B1 * 10/2017 Dorrance ............. H04N 13/204
10,311,835 B1   6/2019 Dorrance et al.
(Continued)

FOREIGN PATENT DOCUMENTS

DE    102020206097 A1 * 11/2021
GB         2531534 A  *  4/2016  ........... B60C 11/246
(Continued)

OTHER PUBLICATIONS

Hunter Quick Check® Unmanned Inspection, downloaded from https://www.hunter.com/vehicle-inspection/quick-check/#tires (Aug. 4, 2020).
(Continued)

*Primary Examiner* — Andre J Allen
(74) *Attorney, Agent, or Firm* — Browdy and Neimark, PLLC

(57) ABSTRACT

There is provided a computerized system comprising a processing unit and associated memory configured to obtain a three-dimensional dataset informative of at least part of a tread of a tire, and determine, using the three-dimensional dataset, data informative of tread depth of the tire.

23 Claims, 13 Drawing Sheets

(51) Int. Cl.
*G01M 17/02* (2006.01)
*G01B 11/22* (2006.01)

(58) Field of Classification Search
CPC . B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; B60C /; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06; G01L 17/00; G01L 17/005; G01L 5/20; G01L 19/086; G01L 5/161; G01L 5/1627; G01L 19/12; G01L 9/0075; G01L 19/083; G01L 7/16; G01L 19/0092; G01L 19/08; G01L 5/0019; G01L 7/166; G01L 9/0025; G01L 5/164; G01L 9/0072; G01L 9/125; G01L 19/0636; G01L 5/162; G01L 27/007; G01L 19/0007; G01L 5/0004; G01L 5/16; G01L 25/00; G01L 1/146; G01L 1/16; G01L 27/005; G01L 5/282; G01L 7/04; G01L 9/0073; G01L 19/04; G01L 5/28; G01L 9/0089; G01L 9/12; G01L 1/18; G01L 19/0618; G01L 19/10; G01L 19/16; G01L 5/169; G01L 1/122; G01L 1/2206; G01L 13/00; G01L 19/02; G01L 5/167; G01L 1/22; G01L 1/2287; G01L 3/245; G01L 5/0023; G01L 5/102; G01L 9/0008; G01L 9/0055; G01L 9/04; G01L 1/20; G01L 15/00; G01L 19/141; G01L 19/147; G01L 27/02; G01L 3/14; G01L 5/00; G01L 5/0009; G01L 5/045; G01L 5/223; G01L 7/086; G01L 7/163; G01L 9/0041; G01L 9/0047; G01L 1/142; G01L 1/165; G01L 1/2218; G01L 1/2262; G01L 1/2268; G01L 1/2281; G01L 11/00;

G01L 19/0015; G01L 19/0084; G01L 19/0609; G01L 19/0627; G01L 19/0645; G01L 19/0672; G01L 19/069; G01L 19/148; G01L 27/00; G01L 3/1464; G01L 3/22; G01L 5/108; G01L 5/12; G01L 5/13; G01L 5/133; G01L 5/26; G01L 5/284; G01L 7/022; G01L 7/043; G01L 7/084; G01L 7/088; G01L 7/187; G01L 9/0051; G01L 9/008; G01L 9/06; G01L 9/065; G01L 9/08; G01L 9/14; G01L 19/0038; G01L 19/06; G01L 19/0654; G01L 19/14; G01L 19/142; G01L 19/145; G01L 2019/0053; G01L 3/108; G01L 5/0085; G01L 5/166; G01L 7/02; G01L 9/0052; G01L 9/0098; G01L 9/10; G01B 11/22; G01B 7/28; G01B 5/18; G01B 11/24; G01B 21/20; G01B 3/28; G01B 7/26; G01B 11/16; G01B 11/25; G01B 7/16; G01B 7/345; G01B 11/162; G01B 11/2522; G01B 5/30; G01B 7/282; G01B 7/34; G01B 11/306; G01B 5/20; G01B 7/06; G01B 11/161; G01B 5/0025; G01B 5/255; G01B 5/285; G01B 7/14; G01B 9/025; G01B 11/2441; G01B 11/245; G01B 11/2518; G01B 11/30; G01B 21/18; G01B 21/30; G01B 2210/22; G01B 2210/26; G01B 7/287; G01B 7/30; G01B 9/021; G01B 1/00; G01B 11/0608; G01B 11/275; G01B 11/2755; G01B 11/303; G01B 15/00; G01B 17/00; G01B 17/02; G01B 21/047; G01B 21/12; G01B 21/26; G01B 21/32; G01B 5/0002; G01B 5/06; G01B 5/252; G01B 7/087; G01B 11/00; G01B 11/002; G01B 11/026; G01B 11/028; G01B 11/04; G01B 11/06; G01B 11/0691; G01B 11/08; G01B 11/14; G01B 11/165; G01B 11/167; G01B 11/2416; G01B 11/2513; G01B 11/255; G01B 11/272; G01B 11/28; G01B 15/02; G01B 17/04; G01B 21/04; G01B 21/042; G01B 21/08; G01B 21/22; G01B 2210/20; G01B 2210/28; G01B 2210/50; G01B 2210/58; G01B 3/1084; G01B 3/1092; G01B 3/14; G01B 3/30; G01B 3/46; G01B 5/0004; G01B 5/08; G01B 5/14; G01B 5/201; G01B 5/213; G01B 5/28; G01B 7/00; G01B 7/048; G01B 7/24; G01B 7/281; G01B 7/293; G01B 7/312; G01B 9/02027; G01B 9/02092

USPC .................................................. 73/146–146.8

See application file for complete search history.

(56) References Cited

U.S. PATENT DOCUMENTS

| | | | |
|---|---|---|---|
| 2014/0232852 A1 | 8/2014 | Nobis et al. | |
| 2015/0075271 A1* | 3/2015 | Tracy | G01M 17/027 73/146 |
| 2016/0029006 A1* | 1/2016 | Zoken | H04N 13/221 348/50 |
| 2016/0033368 A1 | 2/2016 | Neau | |
| 2017/0190223 A1* | 7/2017 | Fish | H04N 5/232 |
| 2020/0018591 A1 | 1/2020 | Rose et al. | |
| 2020/0149997 A1 | 5/2020 | Demirel | |
| 2022/0101512 A1* | 3/2022 | Grossman | G06T 7/11 |

FOREIGN PATENT DOCUMENTS

| | | | | |
|---|---|---|---|---|
| WO | WO-2017212915 A1 | * | 12/2017 | ........... B60C 11/246 |
| WO | WO-2020121306 A1 | * | 6/2020 | ........... G06K 9/3258 |
| WO | WO-2020205640 A1 | * | 10/2020 | |

OTHER PUBLICATIONS

Tire Wear Bars, downloaded from https://www.rightturn.com/tire-guide/tire-wear-bar/ (Jan. 27, 2019).

Lecture 16 Stereo and 3D Vision downloaded from https://courses.cs.washington.edu/courses/cse455/09wi/lects/lect16.pdf (Aug. 22, 2017).

Bhamare, M. H., & Khachane, A. (2019). Quality Inspection of Tire using Deep Learning based Computer Vision. Learning, 6(11).

* cited by examiner

SYSTEMS AND METHODS OF DETERMINING TREAD DEPTH

TECHNICAL FIELD

The presently disclosed subject matter relates, in general, to the field of tire inspection, and more specifically, to methods and systems for tread depth estimation.

BACKGROUND

A tire generally includes a tread in which a plurality of grooves is present. The tread of a tire refers to the rubber on its circumference that makes contact with the road or the ground.

Tread depth, which can be defined e.g. as a distance between the bottom of a groove (for example, the deepest groove) and the top of the tread rubber, impacts vehicle stability and road safety.

Measurement of tread depth is currently mostly performed manually. e.g. with a tire tread depth gauge. However, such manual inspection is not only costly and time consuming, but also prone to inspection errors and variations caused by specific personnel performing the inspection.

There is therefore a need to propose new systems and methods to measure tread depth.

GENERAL DESCRIPTION

In accordance with a first aspect of the presently disclosed subject matter, there is provided a computerized system comprising a processing unit and associated memory configured to obtain a three-dimensional dataset informative of at least part of a tread of a tire, and determine, using the three-dimensional dataset, data informative of tread depth of the tire.

In addition to the above features, the system according to this aspect of the presently disclosed subject matter can optionally comprise one or more of features (i) to (xix) below, in any technically possible combination or permutation:

i. the system is configured to obtain at least two images of a tire acquired at different viewing angles, wherein each of the two images is informative of a tread of the tire, and generate, using the two images, the three-dimensional dataset informative of at least part of the tread based on the two images;

ii. the system is configured to determine data informative of tread depth at various locations around the tread, wherein the locations are spread along a portion of a total circumference of the tread which corresponds to at least 5% of the total circumference of the tread;

iii. the system is configured to determine data informative of tread depth at various locations around the tread, wherein the three-dimensional dataset is obtained based on data acquisition of the tread which captures, in a single acquisition, data informative of at least 5% of the total circumference of the tread;

iv. the system is configured to determine, for at least one groove of the tread, data informative of tread depth for at least 100 different locations along a bottom of the groove;

v. the three-dimensional dataset comprises a plurality of points, wherein at least some of the plurality of points have a position in the three-dimensional dataset which depends on at least one of (1) a viewing angle of the tread by a device, and (2) a curvature of the tread, wherein the system is configured to generate a corrected height for at least some of the plurality of points which is independent of at least one of (1) and (2) according to a criterion;

vi. the system is configured to generate, using the three-dimensional dataset, a map informative of height profile of at least part of the tread, and determine, using the map, data informative of tread depth of the tire;

vii. at least one groove present in the tread, which is represented as a curved portion in the three-dimensional dataset, is represented as a substantially straight portion in the map;

viii. generating the map includes unwrapping the three-dimensional dataset, or data informative thereof;

ix. the system is configured to identify, in the map, at least one area corresponding to a sidewall of at least one groove present in the tread based on a direction orthogonal to said area in the map.

x. the system is configured to project at least part of the three-dimensional dataset along a predefined axis, and fit a predefined shape to a representation of the tread in the three-dimensional dataset;

xi. the predefined shape includes a cylinder, or a toroid;

xii. the system is configured to use a relationship enabling unwrap of the predefined shape into a surface to generate the map;

xiii. the system is configured to determine at least one surface in the three-dimensional dataset of the tread which is substantially flat according to a criterion, determine a local direction orthogonal to the surface, and determine data informative of tread depth of the tire using the local direction;

xiv. the system is configured to generate, for each of a plurality of points of said surface, a corrected height with respect to said local direction, and determine data informative of tread depth of the tire using the corrected height of each of a plurality of points of said surface;

xv. the system is configured to determine a plurality of given surfaces of the tread in the three-dimensional model, wherein each given surface is substantially flat according to a criterion, determine, for each given surface, a given local direction orthogonal to said given surface and determine data informative of tread depth of the tire using given local directions determined for the given surfaces;

xvi. the system is configured to obtain a training set comprising, for each training sample of the training set, an image of a tire and data informative of tread depth of the tire, and feed the training set to a machine learning module, to train the machine learning module to estimate, based on an image of a tire, tread depth of the tire;

xvii. each training sample comprises a single image of a tire and data informative of tread depth of the tire;

xviii. the system is configured to obtain a single image of a given tire and to estimate, using the machine learning module after its training, tread depth of the given tire; and xix. at least one image used to generate the three-dimensional dataset is acquired by an imaging device from a first angle relative to a longitudinal direction perpendicular to a surface of the tread, and wherein the tire is illuminated by an illumination device from a second angle relative to the horizontal direction, wherein the illumination device and the imaging device are positioned so as to have the first angle being smaller than the second angle.

In accordance with other aspects of the presently disclosed subject matter, there is provided a method comprising using the computerized system as described above (the system can optionally comprise one or more of features (i) to (xix) above) to determine data informative of tread depth of a tire.

In accordance with other aspects of the presently disclosed subject matter, there is provided a non-transitory computer readable medium comprising instructions that, when executed by a processing unit and associated memory, cause the processing unit and associated memory to perform operations in accordance with said method.

In accordance with other aspects of the presently disclosed subject matter, there is provided a computerized system comprising a processing unit and associated memory configured to obtain a training set including a plurality of training samples, wherein each given training sample of the training set comprises at least one image of a given tire, and data informative of tread depth of the given tire, and feed the training set to a machine learning module, to train the machine learning module to estimate, based on an image of a tire, tread depth of the tire.

In addition to the above features, the system according to this aspect of the presently disclosed subject matter can optionally comprise one or more of features (xx) to (xxiii) below, in any technically possible combination or permutation:

xx. a given training sample of the training set comprises at least two images of a given tire acquired at different angles and data informative of tread depth of the given tire, wherein each of the two images is informative of a tread of the given tire, wherein the computerized system is configured to feed the training set to the machine learning module, to train the machine learning module to estimate, based on an at least two images of a tire acquired at different angles, tread depth of the tire;

xxi. at least one given training sample of the training set comprises a single image of a given tire and data informative of tread depth of the given tire, wherein the computerized system is configured to feed the training set to the machine learning module, to train the machine learning module to estimate, based on a single image of a tire acquired at different angles, tread depth of the tire;

xxii. for at least one given training sample associated with a given tire, determination of data informative of tread depth of the given tire comprises obtaining a three-dimensional dataset informative of at least part of a tread of a tire, and determining, using the three-dimensional dataset, data informative of tread depth of the tire; and xxiii. the system is configured to obtain a single image of a tire and to estimate, using the machine learning module after its training, tread depth of the tire.

In addition to the above features, the system according to this aspect of the presently disclosed subject matter can optionally be configured to obtain a training set comprising one or more training samples, wherein at least one training sample comprises data informative of tread depth of a given tire obtained using the system in accordance with the first aspect of the presently disclosed subject matter (the system can optionally comprise one or more of features (i) to (xix) above).

In accordance with other aspects of the presently disclosed subject matter, there is provided a method comprising using the computerized system as described above (the system can optionally comprise one or more of features (xx) to (xxiii) above) to determine data informative of tread depth of a tire.

In accordance with other aspects of the presently disclosed subject matter, there is provided a non-transitory computer readable medium comprising instructions that, when executed by a processing unit and associated memory, cause the processing unit and associated memory to perform operations in accordance with said method.

In accordance with other aspects of the presently disclosed subject matter, there is provided a computerized system comprising a processing unit and associated memory configured to obtain at least one image of a tire, wherein the at least one image is informative of a tread of the tire, feed the at least one image to a trained machine learning module, and estimate, using the machine learning module, tread depth of the tire.

According to some embodiments, the image is a single image of the tire.

In accordance with other aspects of the presently disclosed subject matter, there is provided a method comprising using the computerized system as described above to determine data informative of tread depth of a tire.

In accordance with other aspects of the presently disclosed subject matter, there is provided a non-transitory computer readable medium comprising instructions that, when executed by a processing unit and associated memory, cause the processing unit and associated memory to perform operations in accordance with said method.

The proposed solution enables automatized measurement of tread depth.

According to some embodiments, the proposed solution is efficient, flexible, lightweight, and simple to implement.

According to some embodiments, the proposed solution enables determination of tread depth of a vehicle while it is travelling.

According to some embodiments, the proposed solution improves accuracy of determining tread depth.

According to some embodiments, the proposed solution enables inspecting a large portion of the tread of a tire to determine tread depth.

According to some embodiments, the proposed solution enables measurement of groove depth with hundreds or thousands of measurements per groove on multiple grooves, thus improving measurement accuracy and reliability.

According to some embodiments, the proposed solution remotely measures tread depth and does not require installation of a hardware system on the vehicle.

According to some embodiments, the proposed system is installed on a side of an inspection lane without need for expensive installation below ground.

According to some embodiments, the proposed solution enables to correctly measure tread depth of any tread groove pattern (beyond vertical treads).

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter can be practiced without these specific details. In other instances, well-known methods have not been described in detail so as not to obscure the presently disclosed subject matter.

Unless specifically stated otherwise, as apparent from the following discussions, it is appreciated that throughout the specification, discussions utilizing terms such as "obtaining", "generating", "determining", "converting", "unwrapping", "projecting", "fitting", "feeding" or the like, refer to the action(s) and/or process(es) of a processing unit that manipulate and/or transform data into other data, said data represented as physical data, such as electronic, quantities and/or said data representing the physical objects.

The term "processing unit" covers any computing unit or electronic unit with data processing circuitry that may perform tasks based on instructions stored in a memory, such as a computer, a server, a chip, a processor, etc. It encompasses a single processor or multiple processors, which may be located in the same geographical zone or may, at least partially, be located in different zones and may be able to communicate together.

Embodiments of the presently disclosed subject matter are not described with reference to any particular programming language. It will be appreciated that a variety of programming languages can be used to implement the teachings of the presently disclosed subject matter as described herein.

Figure 1:
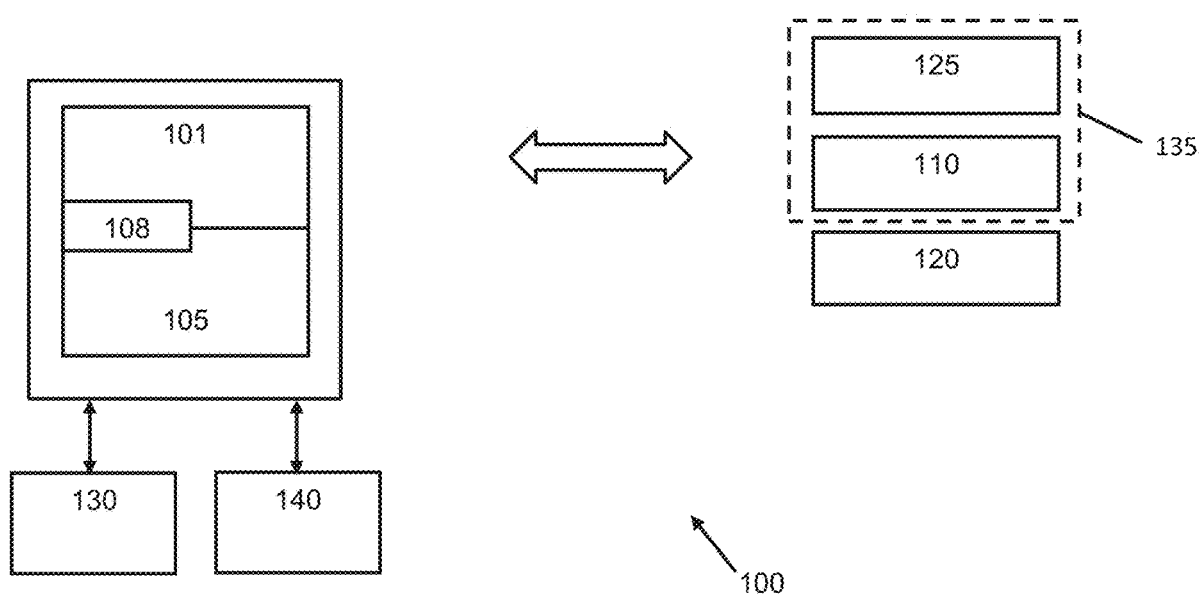
FIG. 1 schematically illustrates a functional block diagram of system which is operative to determine data informative of tread depth of a tire of a vehicle.

FIG. 1 is a schematic representation of an embodiment of a system 100, which is configured for automatic tread depth estimation of one or more tires of a vehicle.

System 100 includes a processing unit 101 and an associated memory 105. According to some embodiments, system 100 can include e.g. an output unit 130 (e.g. a screen) and an interface 140 (e.g. an hardware interface enabling a user to provide commands, such as a keyboard), operatively coupled to the processing unit 101 and the associated memory 105. The processing unit 101 and the associated memory 105 are operative to perform various methods, such as the methods described with reference to FIGS. 3, 6, 7, 8 and 9. The processing unit 101 can be configured to execute one or more functional modules in accordance with computer-readable instructions implemented on a non-transitory computer-readable memory, such as memory 105.

The processing unit 101 and associated memory 105 are operatively coupled to one or more devices 135. As explained hereinafter, data provided by device 135 enables to determine a three-dimensional representation of a tire, and in particular, of a tread of the tire. According to some embodiments, device 135 includes one or more imaging device(s) 110. Each imaging device 110 can correspond e.g. to a camera (such as a digital camera with image and/or video recording functionalities). In some embodiments, device 135 can include other devices 125, such as a RADAR, a LIDAR, a structured light 3D scanner, a 3D laser scanner, etc.

Data communication between the processing unit 101 (and associated memory 105) and the device(s) 135 can be performed using e.g. wire and/or wireless communication.

Device(s) 135 can be part of system 100 or can be external to system 100 and therefore can be configured to communicate data with system 100.

According to some embodiments, imaging device(s) 110 includes one or more stereo cameras. A stereo camera includes two or more lenses with a separate image sensor or film frame for each lens, which enables capturing/generating stereoscopic images (corresponding to two slightly offset images of an object).

According to some embodiments, at least two imaging devices 110 are provided, which are located in close proximity with a relative offset (e.g. horizontal offset) between them. The two imaging devices 110 can acquire images of at least one tire, e.g. simultaneously.

According to some embodiments, system 100 includes (or is operatively coupled with) an illumination device 120. Illumination device 120 is operative to illuminate a region in which a tire of the vehicle is located, thereby facilitating acquisition of an image of the tire by imaging device 110.

According to some embodiments, illumination device 120 can include e.g. one or more light sources which produce a light focused towards the region of interest. The illumination device 120 can be located in close proximity to the imaging device 110 (e.g., positioned on the same side of the tire as the imaging device 110) and is configured to provide illumination covering the Field of View (FOV) of the imaging device 110 so as to enable images to be captured, e.g. at high resolution and quality. In some cases, the imaging device 110 and/or the illumination device 120 can be attached to a supporting structure, such as one pole positioned on at least one side of the inspection lane. The imaging device and/or the illumination device can be attached to the supporting structure at an appropriate height and/or angle in relation to the tire to be inspected.

Imaging device 110 is configured to acquire image(s) of at least one tire (or more) of a vehicle.

In some cases, the vehicle can be a moving vehicle and images of the tire(s) are acquired while the vehicle is moving on an inspection lane. In some other cases, the tires to be inspected are stationary tires, either stand-alone on the inspection lane, or associated with a stationary vehicle. In cases where the tire to be inspected is a rotating tire of a moving vehicle, the image acquisition can be triggered by an external sensing device which can detect the presence/approach of the vehicle (such as, e.g., road loop, Infra-red (IR) beam, VMD, etc.).

Imaging device(s) 110 are arranged at a location which enables acquiring images of at least one tire of a vehicle.

Figure 2:
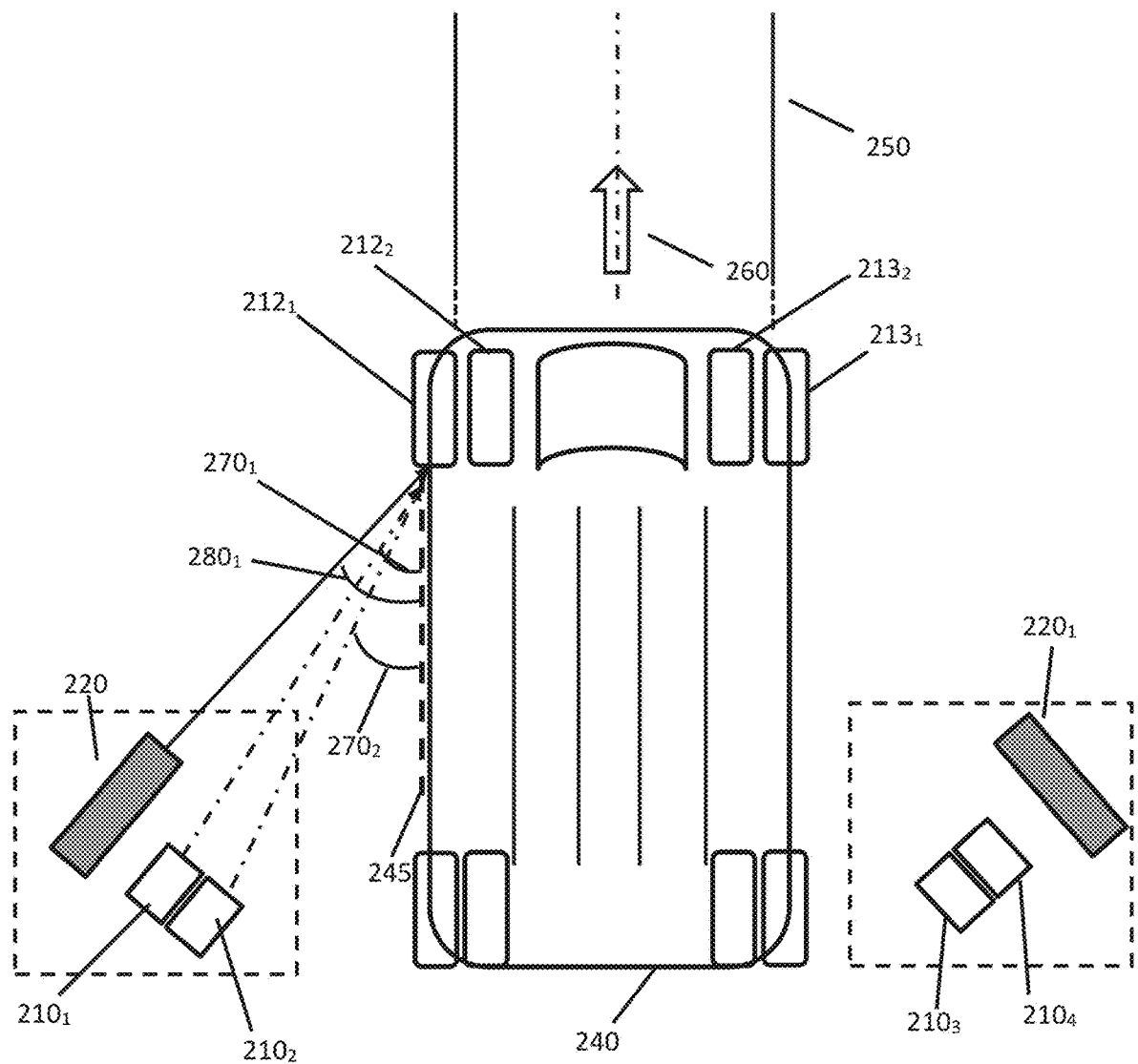
FIG. 2 schematically illustrates an architecture enabling acquiring images of a tire of a vehicle, wherein the images are usable to determine tread depth of the tire.

According to some embodiments, imaging device(s) 110 are located, at least partially, underground (this configuration is not depicted in the drawings). For example, a cavity, covered by a transparent shield, can be present in an inspection lane (e.g. in the road) to accommodate imaging device(s) 110. When the vehicle reaches a position corresponding to the location of the cavity (as mentioned, acquisition can be performed either during motion of the vehicle, or when the tire/vehicle is stationary), imaging device(s) 110 acquire images(s) of at least one tire of the vehicle. Acquiring images of a tire with an above-ground imaging device (as in FIGS. 2 and 2A) enables acquisition of a larger portion of the tire.

According to some embodiments, a first subset of one or more imaging devices is located on a first side of the vehicle (or of the tire to be inspected), and/or a second subset of one or more imaging devices is located on a second side (opposite to the first side) of the vehicle (or of the tire to be inspected). Tire images from both sides of the vehicle can be simultaneously acquired and processed. A specific embodiment of this configuration will now be described with reference to FIG. 2.

One or more imaging devices $210_1$, $210_2$ can be located (e.g. mounted or otherwise situated) on at least one side of tires $212_1$, $212_2$ to be inspected (e.g. on at least one side of an inspection lane 250 on which vehicle 240 is located or travels) and configured to acquire one or more images of the tire. According to certain embodiments, taking the tire $212_1$ for example (the same applies to tire $212_2$), imaging device $210_1$ is positioned/oriented to face the tire from a first angle $270_1$ relative to a longitudinal direction 245 perpendicular to the surface of the tire tread, and the one or more images are acquired by imaging device $210_1$ from the first angle $270_1$. In some embodiments, the longitudinal direction 245 can be parallel to a travelling direction 260 of the vehicle 240 and/or to the longitudinal axis of the vehicle 240.

In some embodiments, an illumination device 220 is positioned/oriented to illuminate the tire from a second angle $280_1$ relative to the longitudinal direction 245. The imaging device $210_1$ and the illumination device are positioned so as to have the first angle $270_1$ being smaller than the second angle $280_1$.

In some embodiments, since the illumination device 220 is shedding light from the side of the tire, and the tread blocks part of the light, it naturally causes a shadow section and an illuminated section at the bottom and/or the sidewall of the groove of the tire. Since the imaging device is positioned with a smaller angle with respect to the tire as compared to the illumination device, the image as acquired can capture the entire illuminated section and at least part of the shadow section. This configuration facilitates determination of disparity between two images of the tire. This is however not mandatory.

Similarly, imaging device $210_2$ is positioned/oriented to face the tire $212_1$ from a first angle $270_2$ relative to the longitudinal direction 245 perpendicular to the surface of the tire tread, and the one or more images are acquired by imaging device $210_1$ from the first angle $270_1$. The imaging device $210_2$ and the illumination device 220 are positioned so as to have the first angle $270_2$ being smaller than the second angle $280_1$.

In some embodiments one or more imaging devices $201_3$, $201_4$ (e.g. one or cameras) and an associated illumination device $220_1$ can be located on another side of the inspection lane 250 (e.g. right side of the inspection lane 250). Relative position and/or orientation of the imaging device(s) with respect to an associated illumination device can be selected to be similar to the configuration described in FIG. 2. This configuration is therefore not described again. This enables acquiring an image of tire(s) $213_1$, $213_2$ on the other side of the vehicle 240.

In some embodiments, and as explained hereinafter, a single imaging device can be used (e.g. a single imaging device per side of the inspection lane or per side of the vehicle) to acquire images of tire(s) of the vehicle (e.g. for each side of the vehicle).

In some embodiments, the single imaging device can be located underground.

Figure 2A:
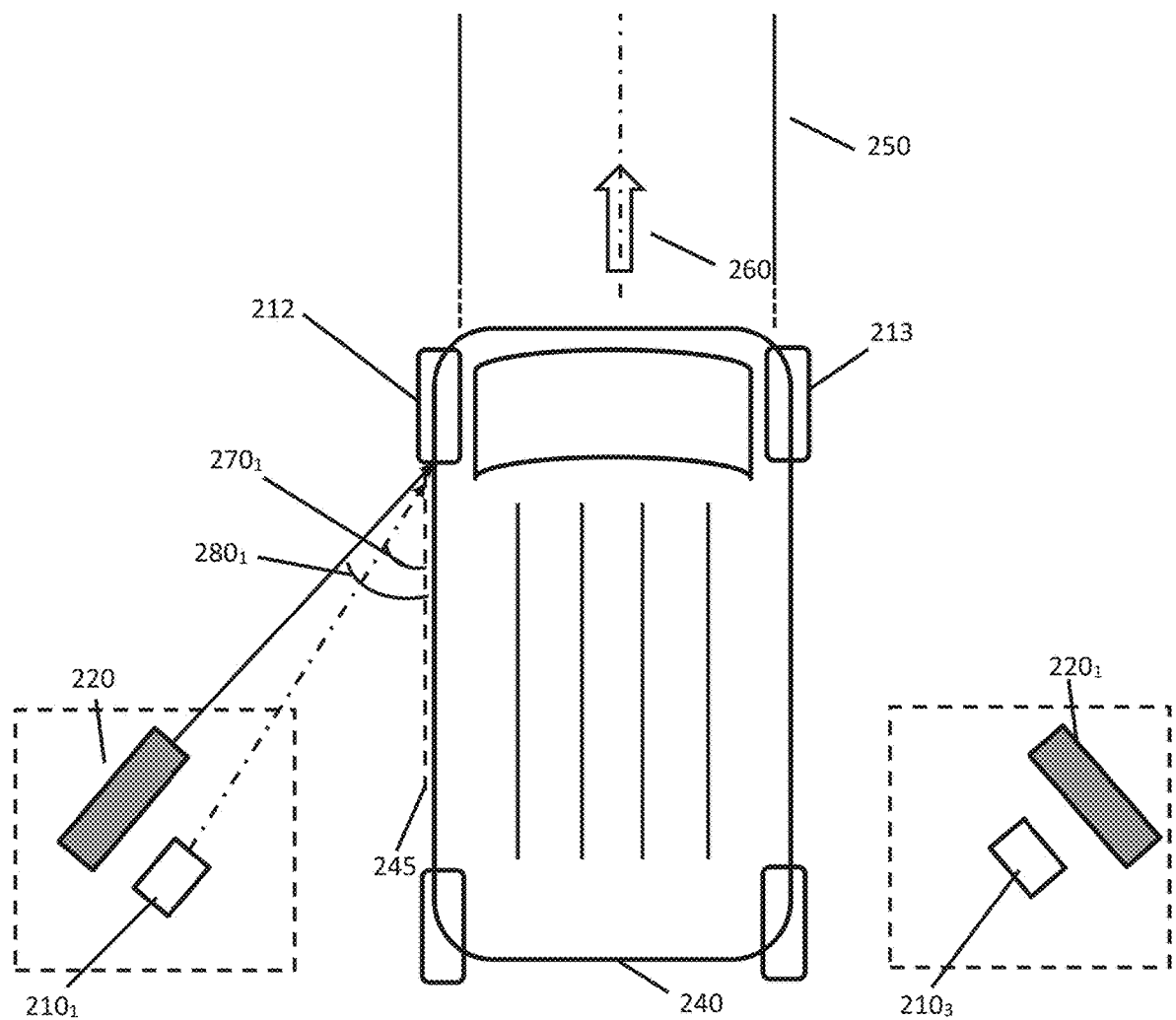
FIG. 2A schematically illustrates a variant of the architecture of FIG. 2.

In other embodiments, and as depicted in FIG. 2A, a single imaging device $210_1$ and an illumination device 220 can be located on a side of the inspection lane 250 (left side in FIG. 2A). Although FIG. 2A depicts a vehicle with a single forward left tire 212 and a single forward right tire 213, this applies to multiple tires as in FIG. 2 (e.g. in case of a truck). The single imaging device $210_1$ can be located relative to the illumination device 220 as explained with reference to FIG. 2. According to some embodiments, another single imaging device $210_3$ (together with an associated illumination device $220_1$) can be located on another side of the inspection lane 250, which enables acquiring images of tire(s) 213 located on the other side of the vehicle 240. The single imaging device $210_3$ can be located relative to the illumination device $220_1$ as explained with reference to FIG. 2.

If a device 125 (which is not necessarily a camera, as explained above) is used to acquire three-dimensional data of the tire and/or of the tread, it can be also located e.g. on a side of the tire to be inspected and/or on the side of the inspection lane.

Figure 3:
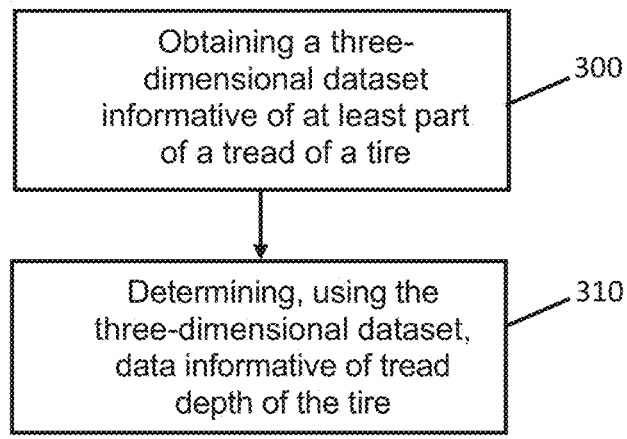
FIG. 3 schematically illustrates a generalized flowchart of a method of determining tread depth of a tire of a vehicle.

Attention is now drawn to FIG. 3. The method of FIG. 3 includes obtaining (operation 300) a three-dimensional dataset informative of at least part of a tread of a tire. The three-dimensional dataset can be obtained e.g. from device 135 and/or based on data provided by device 135. The three-dimensional dataset corresponds e.g. to a three-dimensional point cloud (a set of data points in space enabling 3D visualization of the tire, or at least of the tread). The three-dimensional dataset provides a three-dimensional representation of at least part of the tread.

As further explained hereinafter, the three-dimensional dataset can be obtained using various methods. In some embodiments, stereoscopic image acquisition can be used (see FIG. 6). In some embodiments, other devices can provide the three-dimensional dataset (or data enabling to generate the three-dimensional dataset), such as a RADAR, a LIDAR, a structured light 3D scanner, a 3D laser scanner, etc.

In some embodiments, the three-dimensional dataset is informative of both the tread and other parts of the tire. Various methods can be used to differentiate between the tread and other parts of the tire, as explained hereinafter.

The method of FIG. 3 further includes determining (operation 310), using the three-dimensional dataset, data informative of tread depth of the tire.

The term "tread depth" refers to the depth of the grooves (patterns) on the tire tread. It is a vertical measurement from the top of the tire's rubber (i.e., the surface of the tread—which corresponds to the surface of the raised rubber segments, also called tread blocks) to the bottom of the tire's grooves. Tread depth can be measured on several positions along the width of the tire.

According to some embodiments, the method enables to determine data informative of tread depth at various locations around the tread. In some embodiments, the locations are spread along a portion of a total circumference of the tread which corresponds to at least 5% of the total circumference of the tread. In some embodiments, the locations are spread along a portion of a total circumference of the tread which corresponds to 5% to 20% of the total circumference of the tread (or any value within the range [5%-20%], e.g. at least 10%, at least 15%, etc.). In other words, a large coverage of tire circumference is achieved.

According to some embodiments, the three-dimensional dataset is obtained based on data acquisition of the tread which captures, in a single acquisition, at least 5% of the total circumference of the tread (or any value within the range [5%-20%] of the circumference of the tread). For example, as explained hereinafter, in some embodiments, the three-dimensional dataset can be obtained based on an image acquisition of the tread. Each image can capture by itself at least 5% (or more as mentioned above) of the total circumference of the tread. This applies also to other types of acquisition, such as radar acquisition, etc.

According to some embodiments, tread depth can be determined, for at least one groove of the tread (or for each of a plurality of grooves of the tread), tread depth (or data informative thereof) for at least 100 different locations along a bottom of the groove, or for at least 1000 different locations, or more. In other words, a high resolution is achieved. In some embodiments, and as mentioned above, these various locations are spread along an important fraction of the circumference of the tread, such as at least 5% of the total circumference of the tread.

According to some embodiments, since a significant portion of the tread is inspected, it is possible to determine statistical data informative of the tread depth over the tread, such as average, median, variance, etc. According to some embodiments, additional data, such as tread width, can be determined.

As mentioned above, the three-dimensional dataset comprises a plurality of points. In some embodiments, device 135, which acquires data enabling to generate a three-dimensional dataset of the tread, acquires data from the side of the tread. In other words, a viewing angle exists between the line of sight of the device 135 and a reference axis if the tire (see e.g. viewing angles $270_1$, $270_2$).

As a consequence, the position of at least some points of the tread in the three-dimensional dataset (in particular their depth or height) is affected by this viewing angle.

In addition, since the tread comprises a curvature, the position of at least some points of tread in the three-dimensional dataset (in particular their depth or height) is affected by this curvature.

In order to determine tread depth, the method can include determining the "true" position (in particular the "true" height—also called depth) of points of the tread in the three-dimensional dataset, which is not affected by the viewing angle(s) and/or by the curvature of the tread. In particular, and as explained hereinafter, the method can include generating a corrected position (e.g. corrected depth or height) for at least some of the plurality of points of the tread in the three-dimensional dataset, which is independent of the viewing angle(s) and/or the curvature of the tread, e.g. according to a criterion. Various embodiments are described hereinafter. The criterion reflects to what extent effect of the viewing angle(s) and/or of the curvature of the tread on the position (e.g. depth or height) of the points of the tread is removed when generating the corrected position (e.g. corrected depth or height). In some embodiments, the criterion can reflect e.g. a level of required accuracy. In some embodiments, the criterion is such that effect of the viewing angle(s) and/or of the curvature in the corrected depth or height is totally removed.

Figure 3A:
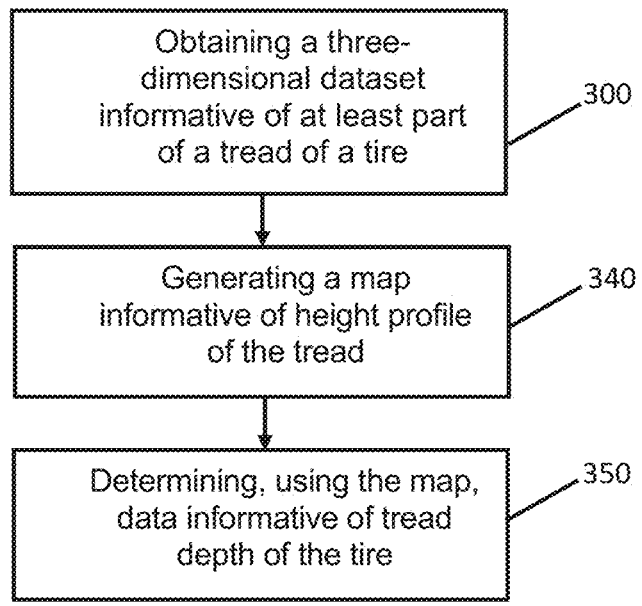
FIG. 3A schematically illustrates a generalized flowchart of a method of determining tread depth of a tire of a vehicle, which includes generating a map informative of height profile of the tread.

Attention is drawn to FIG. 3A which depicts a possible embodiment of the method of FIG. 3.

The method includes obtaining (operation 300) a three-dimensional dataset informative of at least part of a tread of a tire.

The method of FIG. 3 further includes (operation 310) using the two images to generate a three-dimensional data informative of the tire. Indeed, since two images of the tire acquired at different angles are available, it is possible to convert these images into a three-dimensional model using stereoscopic imaging methods.

Attention is drawn to FIG. 3A, which depicts an embodiment of the method of FIG. 3.

The method of FIG. 3A comprises operation 300 already described above.

The method of FIG. 3A further includes generating (operation 320), using the three-dimensional dataset, a map 500 (see FIG. 5A) informative of the height profile of at least part of the tread.

Figure 4:
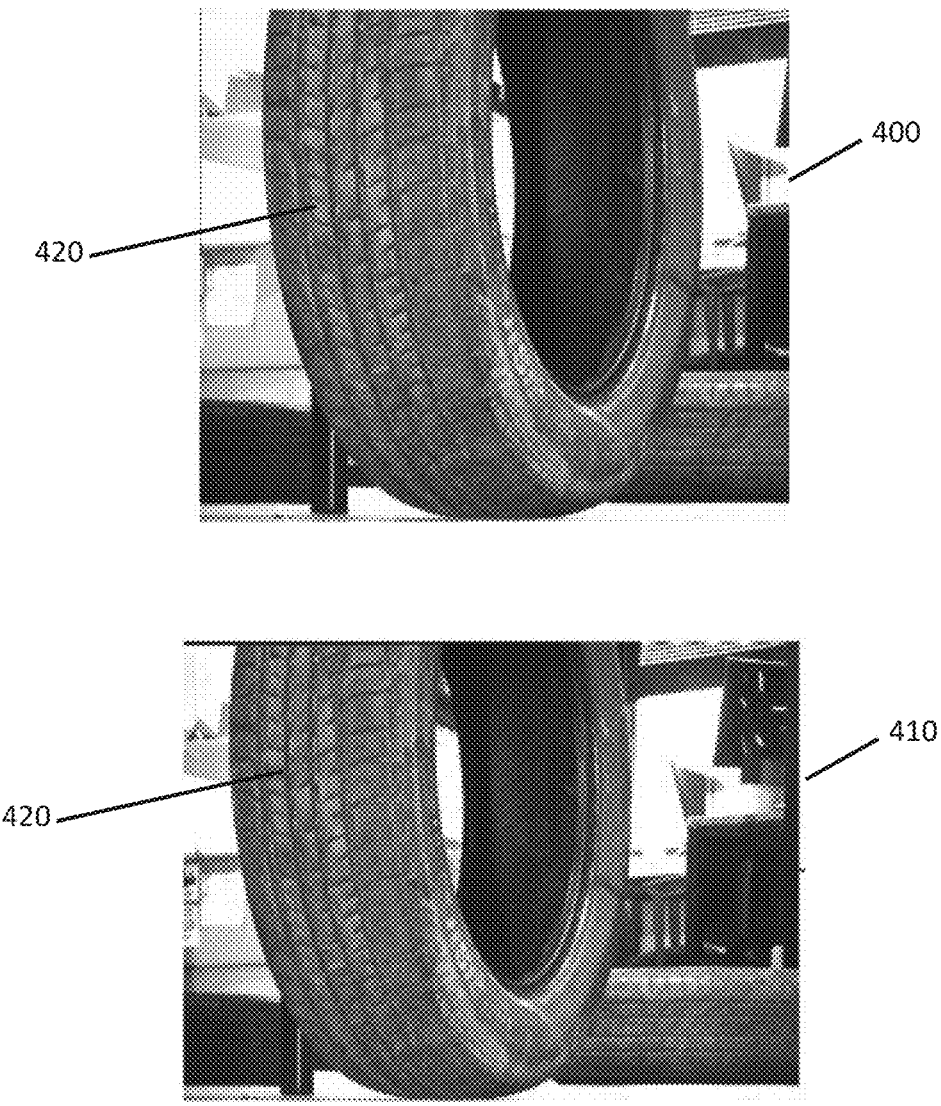
FIG. 4 illustrates two images of a tire acquired at different angles.

The tread of the tire (also referred to as tire tread, tread or track—see e.g. tread 420 in FIG. 4) refers to the rubber on its circumference, which is operative to engage with the road surface. The tread includes tread blocks (see references 501, 509, 519 and 529 in FIG. 5) which are the raised rubber segments that make contact with the road surface, and grooves (see references 505, 510, 520 and 530 in FIG. 5) which are channels which run circumferentially and laterally around the tread. The grooves are embedded or molded into the rubber. The grooves are designed to allow water to be expelled from beneath the tire and prevent hydroplaning. As tires are used, the tread is worn off, limiting its effectiveness in providing traction, and the vehicle can suffer from extended braking distances. Shallow tread grooves also make it harder to control the vehicle in wet weather, and the chance of hydroplaning increases. To assess tire wear condition, tread depth can be estimated and provided as a direct indication of the tire's condition.

Figure 5:
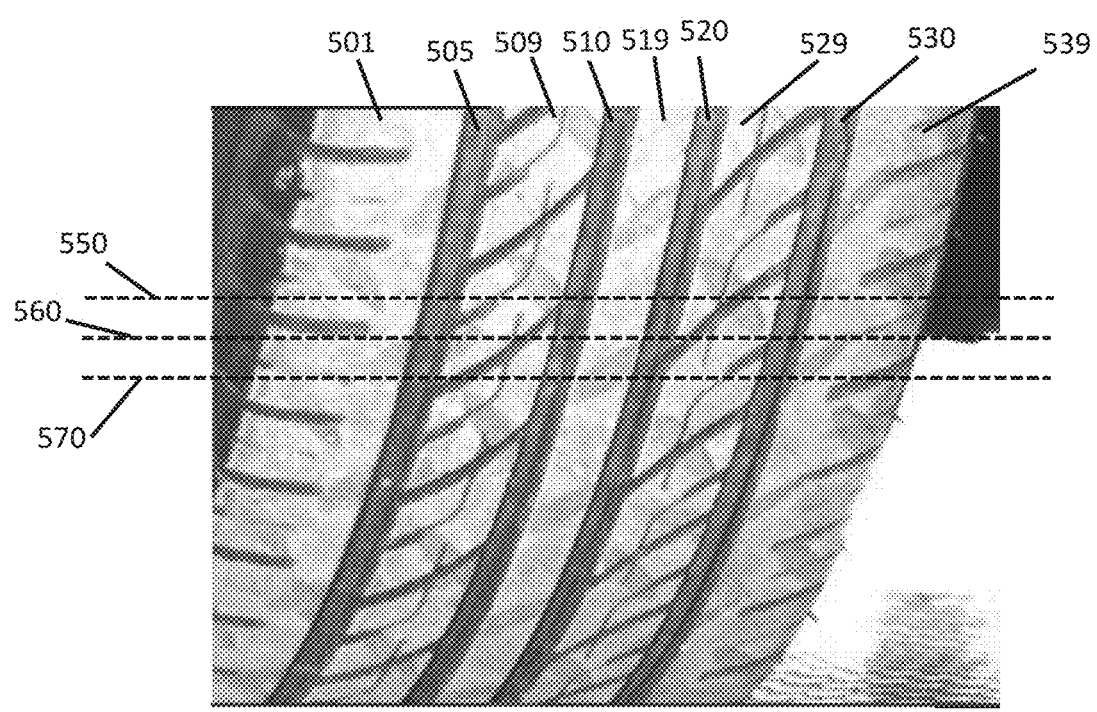
FIG. 5 illustrates an image of a tread of a tire.
Figure 5A:
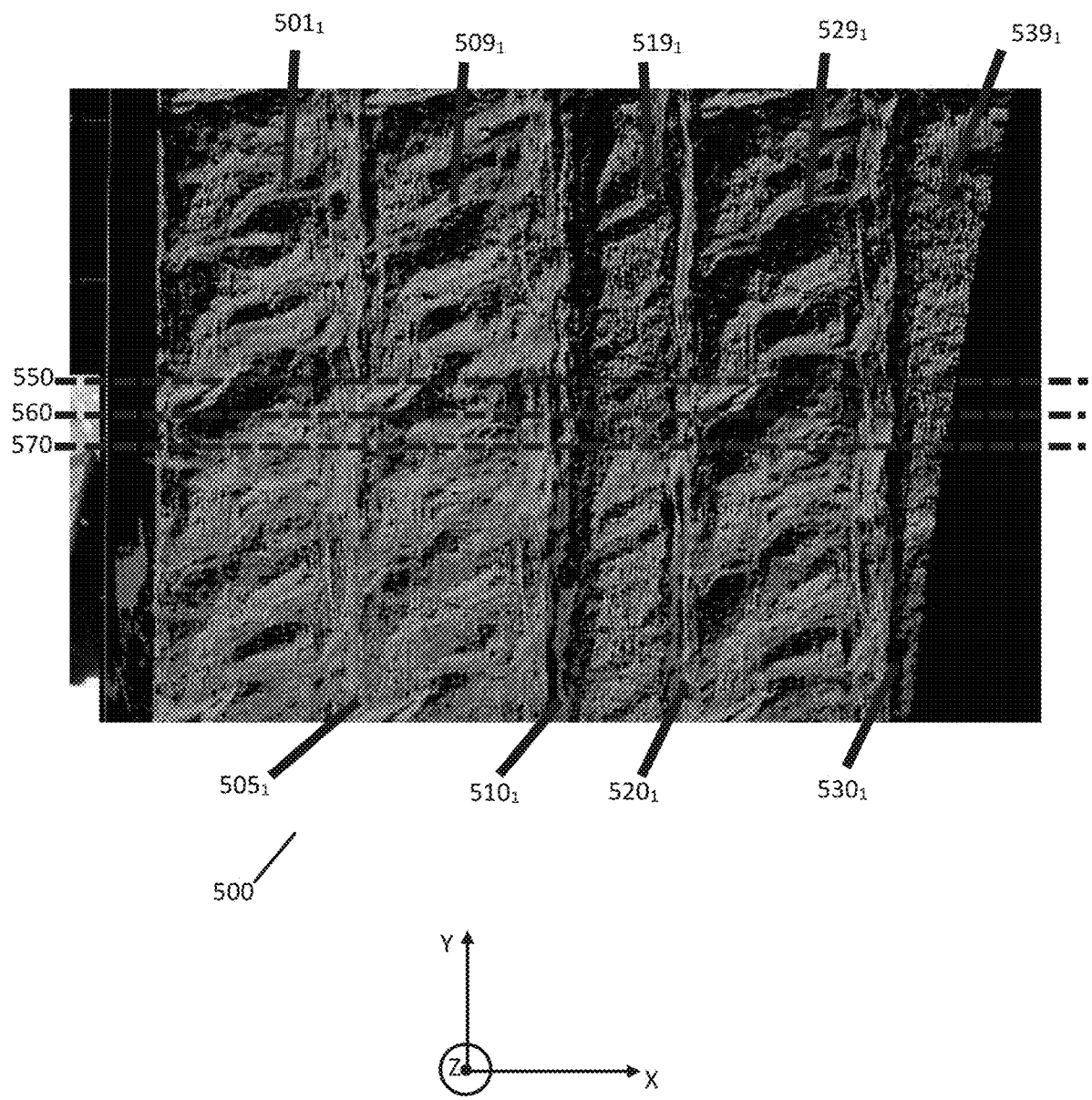
FIG. 5A illustrates a map informative of height profile of a tread of a tire.

According to some embodiments, and as shown in FIGS. 5 and 5A, at least one groove present in the tread, which is represented as a curved portion in the three-dimensional dataset (since the groove runs along the circumference of the tread), is represented as a substantially straight portion in the map 500.

For example (see FIG. 5A), assume that the map 500 is located in a plane X, Y (axis Z corresponds to the height of each point).

Each groove 505, 510, 520 and 530, which corresponds to a curved portion in the tread (and in the three-dimensional dataset), is represented in the map 500 as a corresponding straight portion $505_1$, $510_1$, $520_1$ and $530_1$ in plane X, Y of the map 500.

In other words, according to some embodiments, the map corresponds to an unwrapped projection of the three-dimensional dataset, or data representative thereof, thereby facilitating measurement of tread depth.

In addition, the map includes data informative of the height (also called depth) of points of the tread, wherein the height (corrected height, or corrected depth) as measured in the map is independent on the viewing angle and curvature of the tread.

The map provides height profile at various different locations along the circumference of the tread.

Location of the grooves and/or of the tread blocks of the tread can be determined in the map 500.

According to some embodiments, this can include determining areas (also called "blobs") of the map 500 which correspond to the grooves and areas (also called "blobs") of the map 500 which correspond to the tread blocks.

For example, grooves can be identified as areas of the map which are associated with a minimal height (e.g. relative to adjacent areas) in the map. Therefore, areas $505_1$, $510_1$, $520_1$ and $530_1$ of the map are identified as corresponding to the grooves.

Tread blocks of the tread can be identified as areas of the map which are associated with a maximal height (e.g. relative to adjacent areas) in the map. Therefore, areas $501_1$, $509_1$, $519_1$, $529_1$ and $539_1$ of the map are identified as corresponding to the tread blocks.

In order to differentiate between areas of the map corresponding to sidewalls of the grooves, and other areas of the map (corresponding to grooves and tread blocks), the method can include determining, for each of a plurality of areas of the map, a local direction which is orthogonal to the area (normal direction). Areas corresponding to the grooves and areas corresponding to the tread blocks have substantially parallel normal directions (oriented towards a first direction), and areas corresponding to the sidewalls have a normal direction orientated towards a second direction (different from the first direction, the second direction being generally orthogonal to the first direction).

Once areas of the map corresponding to the grooves and areas of the maps corresponding to tread blocks have been identified, it is possible to determine tread depth (e.g. by determining differences between height of grooves and height of tread blocks in the map).

According to some embodiments, tread depth is determined as a difference between height of the top of the tread rubber (tread blocks) and height of the bottom of the tread's grooves.

Data informative of tread depth can be output to the user. In some embodiments, a recommendation indicative of whether the tread (or the tire) should be replaced is provided, based on a comparison between tread depth as determined for the tire, and required tread depth.

New tires typically have an average tread depth of 8 to 9 millimeters ($10/32$ to $11/32$ inches). Most tire manufacturers consider tires to be worn when one or more of their grooves are worn down to 1.6 millimeters ($2/32$ inches), which must be replaced. For safety reasons, in some cases it is recommended to have a minimum tread depth of 3 millimeters for summer tires, and at least 4 millimeters ($5/32$ inches) for winter tires. These values are not limitative, and can change depending on the geographical zone, type of car, etc.

Since the map provides height profile for various slices/ various locations of the tread, it is possible to determine statistical data informative of the tread depth over the tread, such as average, median, variance, etc. In some embodiments, average tread depth per groove can be determined. In some embodiments, additional data informative of the tread can be determined, such as average width of the grooves.

As mentioned above, it is possible to determine data informative of tread depth for various locations along the circumference of the tread.

In some embodiments, tread depth can be determined for various slices of one or more grooves.

For a given slice (along a given direction parallel to axis X) of a groove in the map, a difference between height of the groove, and adjacent prominent tread blocks of the tread rubber can be determined using the map, thereby providing local value of tread depth. For at least one groove which runs along a circumference of the tread, the map is informative of a depth of the groove for various slices of said circumference. This is shown schematically for a limited number of slices 550, 560 and 570 of the tread, for which it is possible to determine height profile in the map 500. This example is not limitative and other slices of the tread can be analyzed using the map.

Figure 5B:
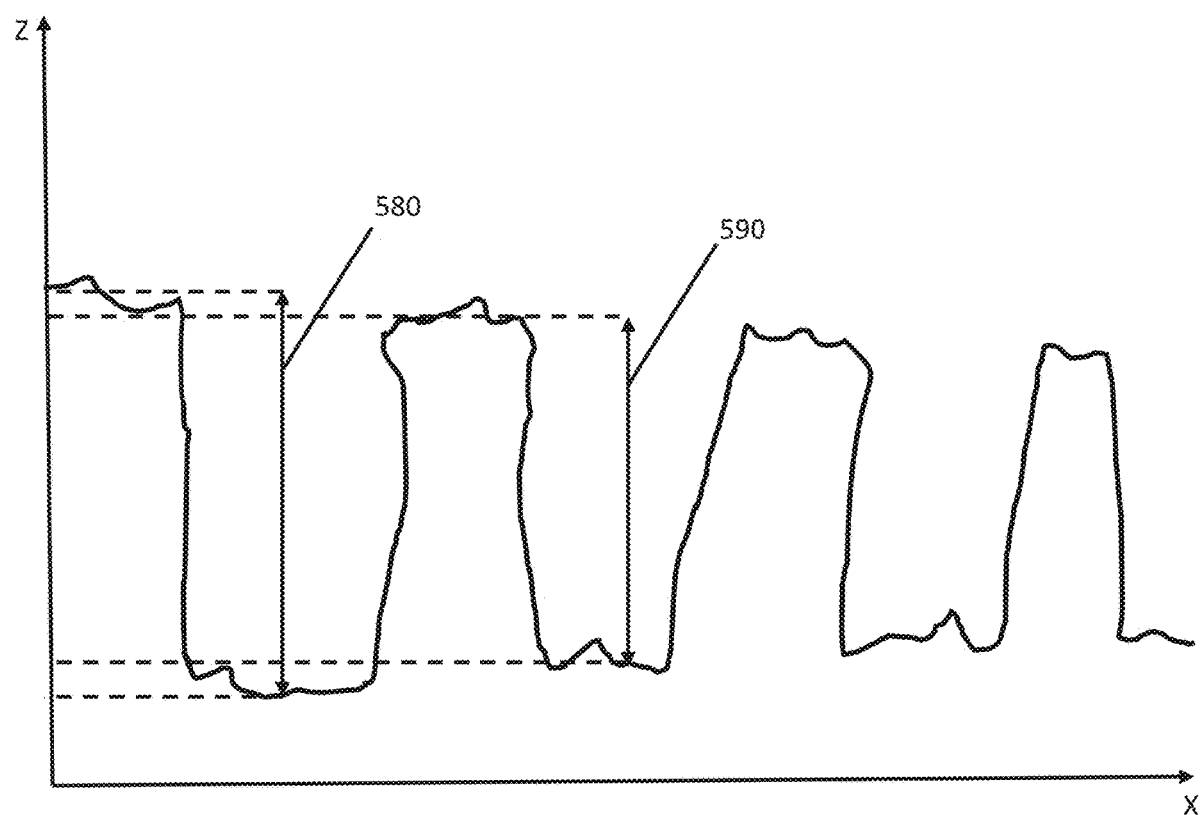
FIG. 5B schematically illustrates height profile along a given slice of the tread, generated based on the map of FIG. 5A.

A non-limitative example of height profile of a given slice (along a given direction parallel to axis X in the map) of the tread is illustrated in FIG. 5B. In this example, distance 580 provides information on tread depth associated with the first groove at the given slice, distance 590 provides information on tread depth associated with the second groove at the given slice, etc.

Figure 6:
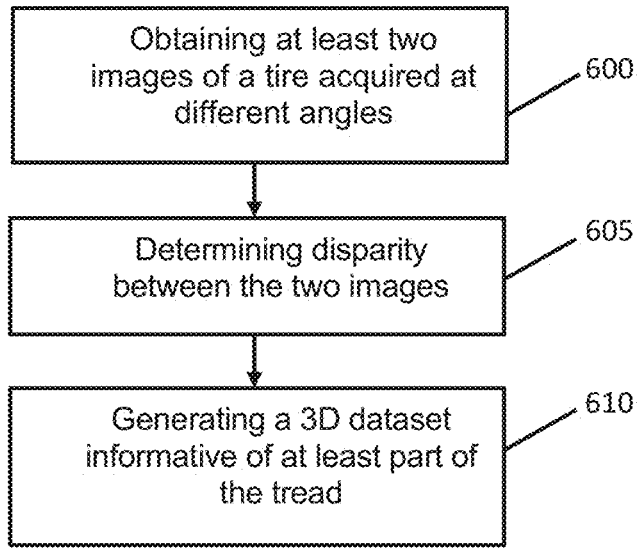
FIG. 6 schematically illustrates a generalized flowchart of a method of generating a three-dimensional dataset informative of a tread using two images of the tire.

Attention is now drawn to FIG. 6.

As mentioned with reference to FIG. 3 (see operation 300), a three-dimensional dataset informative of at least part of the tread of a tire can be obtained. FIG. 6 depicts an embodiment of a method to generate this dataset, using stereoscopic images.

The method includes obtaining (operation 600) includes obtaining at least two images of a tire acquired at different angles, wherein each of the two images is informative of a tread of the tire. Assume a first image and a second image are obtained. The first image has been acquired with a first acquisition/viewing angle (angle between a line of sight of the imaging device which acquired the image and a reference axis of the tire), and the second image has been acquired with a second acquisition/viewing angle (angle between a line of sight of the camera which acquired the image and the reference axis of the tire), wherein the first acquisition/viewing angle differs from the second acquisition/viewing angle.

According to some embodiments, the two images of the tire are acquired simultaneously (e.g. by two different cameras which are e.g. horizontally offset), or with a time offset that can be disregarded. The two images can be acquired and processed using e.g. system 100 described above.

FIG. 4 illustrates an example of two images which can be obtained at operation 600. As visible in FIG. 4, there is an offset between the two images 400, 410 due to the fact that the two images have been acquired at different angles of acquisition (in other words, each image is acquired with a different line of sight).

The method includes determining (operation 605) disparity between the two images. Disparity is informative of difference in coordinates of similar features/points within the two images. Disparity is calculated using standard stereoscopic imaging techniques of the art.

The method includes generating (operation 610), based on the disparity, a three-dimensional dataset (e.g. 3D point cloud) informative of at least part of the tread.

For example, assuming that the optical axes of the two imaging devices are parallel, the depth Z of a point in the three-dimensional dataset is given by:

$$Z = \frac{f \cdot b}{d}$$

In this equation, "f" is the focal length, "b" is the horizontal offset between the two imaging devices, and "d" is the disparity for given corresponding pixels Various methods can be used to determine the three-dimensional dataset (see e.g. courses.cs.washington.edu/courses/cse455/09wi/Lects/lect16.pdf, incorporated herein in its entirety).

Figure 7:
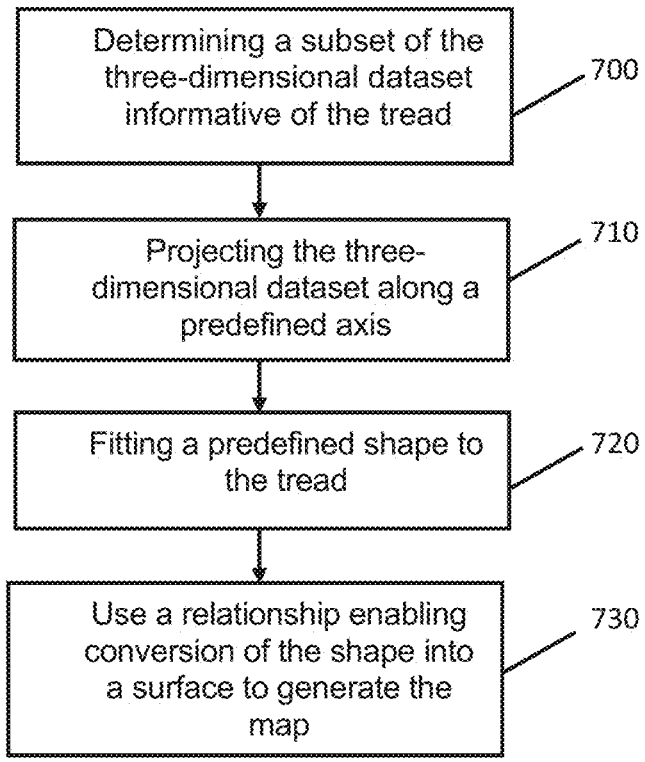
FIG. 7 schematically illustrates a generalized flowchart of a method of generating a map informative of height profile of a tread of a tire.

Attention is now drawn to FIG. 7.

As mentioned with reference to FIG. 3A, the three-dimensional dataset informative of at least part of the tread can be used to generate a map informative of height profile of the tread. FIG. 7 depicts possible operations that can be performed to generate this map.

The method of FIG. 7 includes determining (operation 700) a subset of the three-dimensional dataset which is informative of the tread (corresponding to the external surface of the tire which is configured to engage with the road). In other words, it is intended to differentiate, in the three-dimensional dataset, between the tread and other features of the tire or of the background.

Operation 700 can involve using a machine learning module (which can be implemented e.g. by processing unit 101 and associated memory 105) which is trained, using e.g. supervised learning, to differentiate between the tread and other parts of the tire in an image and/or in a three-dimensional dataset informative of the tire. In some embodiments, determination of the areas corresponding to the tread can be performed before generation of the three dimensional dataset. For example, if the three dimensional data set is generated based on two stereoscopic images, determination of the areas corresponding to the tread can be performed on at least one of the two stereoscopic two dimensional images.

Training of the machine learning module can include feeding a plurality of images and/or three dimensional datasets of a tire to the machine learning module, wherein an area corresponding to the tread is marked e.g. by an operator (supervised learning).

The machine learning module can implement e.g. a deep learning neural network, a Convolutional Neural Network (CNN), or other architectures.

The method is however not limited to the use of a machine learning module and other suitable methods can be used (e.g. image segmentation, 3D surface analysis, random forest decision algorithms, etc.).

The method further includes determining data informative of the orientation of the tread in the three-dimensional dataset. This orientation can be determined by computing a direction which is orthogonal to a side of the tread or of the tire (see e.g. direction 709) in the three-dimensional dataset. This direction can be computed e.g. by averaging a plurality of vectors which are locally orthogonal to the side of the tread or of the tire in the three-dimensional dataset. This direction provides information on the orientation of the tread or of the tire in the three-dimensional dataset.

Figure 7A:
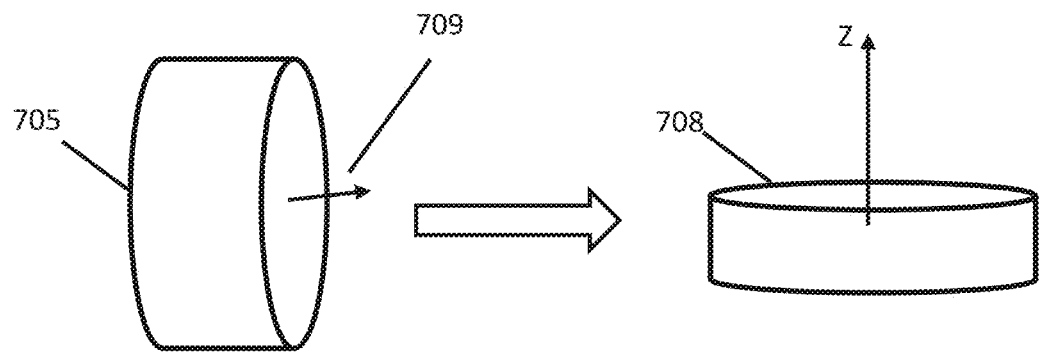
FIG. 7A schematically illustrates a projection of a three-dimensional dataset of informative of a tread along a predefined axis.

It is then possible to project (e.g. rotate) the three-dimensional dataset along a predefined axis. For example, the predefined axis can be e.g. a vertical axis orthogonal to ground. In other words, the three-dimensional dataset informative of the tread undergoes a spatial transformation. It is as if the tread has been disposed as lying on the ground. A non-limitative example of operation 710 is illustrated in FIG. 7A, in which the three-dimensional dataset 705 of the tread is projected along axis Z, to obtain projected three-dimensional dataset 708.

Once the orientation of the three-dimensional dataset of the tread has been fixed, the method can include determining a radius of the tread. The radius is useful to unwrap the three-dimensional dataset, as explained hereinafter.

Determining radius of the tread can include fitting (operation 720) a predefined shape to a representation of the tread in the three-dimensional dataset (e.g. in the projected dataset 708). As mentioned above, location of the tread in the three-dimensional dataset has been identified at operation 700.

According to some embodiments, the predefined shape corresponds to a cylinder. Fitting a cylinder to the representation of the tread can be performed using a fitting algorithm (the parameter to be found is the radius of the cylinder). According to some embodiments, the predefined shape corresponds to a toroid. Fitting a toroid to the representation of the tread can be performed using a fitting algorithm (the parameters to be found are the radius of revolution of the toroid, and the radius of the circular section of the toroid). These examples are not limitative and other shapes can be used.

The method further includes generating (operation 730) a map informative of height profile of at least part of the tread.

As mentioned above, this can include unwrapping the three-dimensional dataset (e.g. after it has been projected along a reference axis, as explained with reference to operation 710), or data informative thereof.

In particular, operation 730 can include using a relationship enabling unwrap of the predefined shape into a surface to generate the map. This relationship defines a spatial transformation enabling projection of the predefined shape into a surface. This spatial transformation can be viewed, at least in some embodiments, as a conformal mapping.

A non-limitative example of a method of projecting (unwrapping) a cylinder into a surface is provided hereinafter (in addition, the method also converts the depth/height coordinate of each point of the three-dimensional dataset).

$$u(x, y) = \operatorname{Re}\left(\frac{(x+iy)^2 + R^2}{x+iy}\right)$$

$$v(x, y) = \operatorname{Im}\left(\frac{(x+iy)^2 + R^2}{x+iy}\right)$$

$$s(z) = R \arcsin\left(\frac{z}{R}\right)$$

In these equations, (x, y, z) correspond to the tree-dimensional coordinates of a point of the three-dimensional dataset, and (u, v, s) correspond to the coordinates of a corresponding point (after the transformation) in the map (u and v correspond to the coordinates in the plane of the map and s correspond to the height or depth). R corresponds to the radius of the cylinder.

A non-limitative example of a method of projecting (unwrapping) a toroid into a surface is provided hereinafter (in addition, the method also converts the depth/height coordinate of each point of the three-dimensional dataset).

$$x = R \cdot (\sin(t) - (t - \theta) \cos(t)) +$$

$$\frac{r \cdot \cos(\theta)}{\sqrt{1 + (t - \theta)^2 (1 - s)^2}} (\sin(t) - (t - \theta)(1 - s) \cos(t))$$

$$y = R \cdot (\cos(t) - (t - \theta)^2 (1 - s)^2) +$$

$$\frac{r \cdot \cos(\varphi)}{\sqrt{1 + (t - \theta)^2 (1 - s)^2}} (\cos(t) - (t - \theta)(1 - s)\sin(t))$$

$$z = r \cdot \sin(\varphi)$$

$$t = (\pi - \theta)s + \theta$$

$$0 \leq \theta \leq 2\pi$$

$$0 \leq s \leq 1$$

Figure 7B:
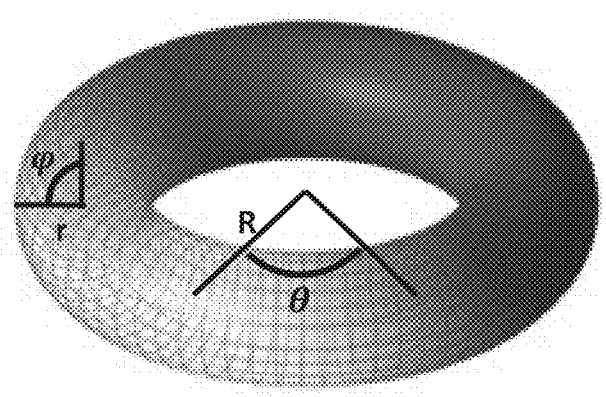
FIG. 7B schematically illustrates a toroid.

In these equations, R is the outer radius of the toroid, r is the inner radius of the toroid, s is a free parameter, θ is an angle in the plane of the toroid and φ is an angle in a cross-sectional plane of the toroid (see FIG. 7B).

Figure 7C:
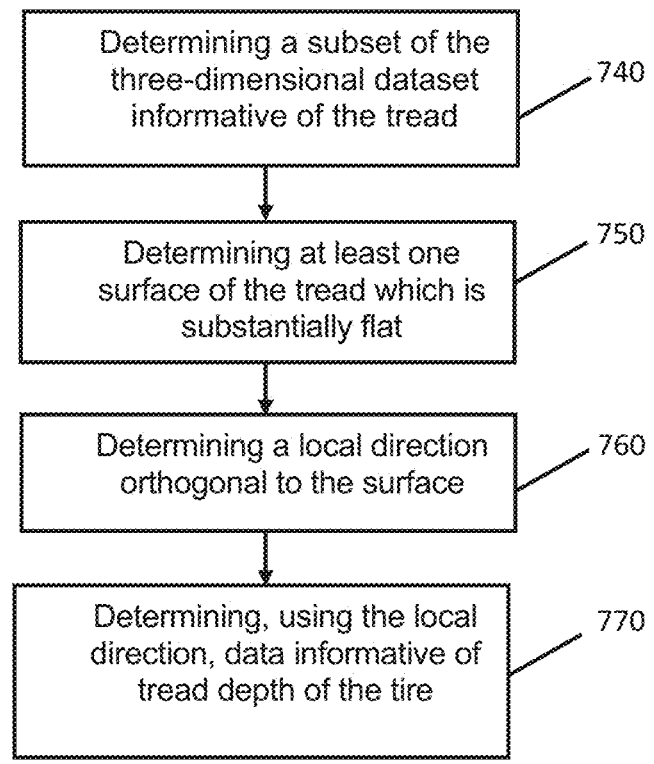
FIG. 7C schematically illustrates a generalized flowchart of a method of determining tread depth of a tire of a vehicle, based on a local analysis of the direction of the tread.
Figure 7D:
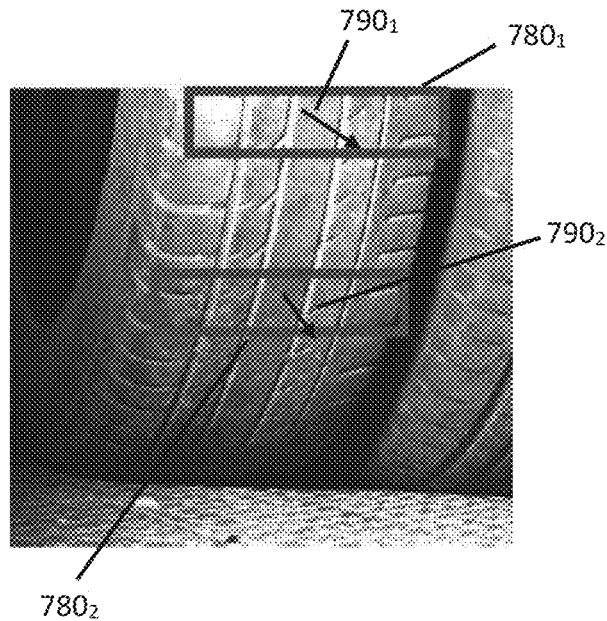
FIG. 7D schematically illustrates a non-limitative example of the method of FIG. 7C.

Attention is now drawn to FIG. 7C, which depicts another method of determining tread depth. The method can include determining (operation 740—similar to operation 700 in FIG. 7) a subset of the three-dimensional dataset which is informative of the tread (corresponding to the external surface of the tire which is configured to engage with the road). The method further includes (operation 750) determining at least one surface (or a plurality of surfaces 780₁, 780₂, etc.—see FIG. 7D) in the three-dimensional dataset informative of the tread which is substantially flat according to a criterion. The criterion can define a maximal deviation which can be accepted between the surface and a perfectly flat surface. The criterion can define a maximal deviation such as it does not significantly impact the tread depth measurement (e.g. corresponding to an error which is lower than 0.2 mm, this value being not limitative).

The partition of the three-dimensional dataset of the tread into surfaces (780₁, 780₂, etc.) for local analysis can be performed with negative, zero or positive overlap between adjacent surfaces. Selection of the surfaces can be made to reduce calculation time while achieving the required accuracy.

The method further includes, for each surface (780₁, 780₂, etc.), determining (operation 760) a local direction 790₁, 790₂, etc. which is orthogonal to the surface (local normal direction). Each local direction is informative of a local tread surface orientation.

The method further includes (operation 770) determining data informative of tread depth of the tire using the local direction (or the plurality of local directions).

Operation 770 can include, for each surface, generating, for each of a plurality of points of the surface, a corrected height (also called corrected depth) with respect to the local direction. In other words, the corrected height (also called corrected depth) is expressed in a referential linked to the local direction. This enables to obtain a corrected height (also called corrected depth) which is not affected by the viewing angle of the device 135 (which provides the three-dimensional dataset informative of the tread, or data enabling generation of this three-dimensional dataset) and by the curvature of the tread. The corrected height (also called corrected depth) corresponds to an output of a product of a vector corresponding to the height (also called depth) measured in the three-dimensional dataset (which is viewed by the device 135) and a vector corresponding to the local direction which is orthogonal to the surface (as determined at operation 760).

Operation 770 can further include, for each surface, determining one or more areas of the surface corresponding to groove(s) and one or more areas of the surface corresponding to tread block(s). Various methods have been described above with reference to FIG. 3A (based on a segmentation of the height of the points) and can be used similarly.

Once area(s) corresponding to groove(s) and area(s) corresponding to the tread block(s) have been identified, data informative of tread depth can be determined based on a difference between height (along the local normal direction) of points belonging to grooves and height (along the local normal direction) of points belonging to the tread blocks. As explained above, tread depth can be computed for various locations along the tread. Similarly, various statistical data informative of tread depth can be computed.

Figure 8:
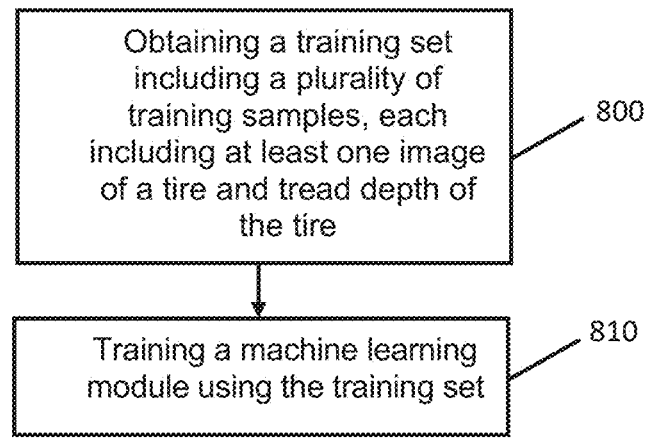
FIG. 8 schematically illustrates a method of training a machine learning model to estimate tread depth of a tire based on one or more images of the tire.

Attention is now drawn to FIG. 8.

The method of FIG. 8 enables training a machine learning module to estimate tread depth of a tire based on at least one image of the tire. In some embodiments, the machine learning module is trained to estimate tread depth of a tire based on a single image of the tire.

The machine learning module can be implemented e.g. by the processing unit 101 and associated memory 105 (see machine learning module 108 in FIG. 1). This is however not limitative, and in some embodiments, the machine learning module can be implemented using a different processing unit and associated memory.

The machine learning module can include a network with a plurality of layers organized according to an architecture such as a Deep Neural Network, Convolutional Neural Network (CNN) architecture, Recurrent Neural Network architecture, Recursive Neural Networks architecture, etc.

The method includes obtaining (operation 800) a training set. The training set includes a plurality of training samples, wherein each training sample includes at least one image of a given tire, and data informative of tread depth of the given tire.

In some embodiments, each training sample includes a single image of the given tire.

Data informative of tread depth of the given tire (for a given training sample) can be obtained using the various methods described above. For example, in some embodiments, tread depth of the given tire was obtained using at least two images of the tire, generating a three-dimensional dataset informative of the tire, and generating a map informative of height profile of the tread (see e.g. the method of FIG. 3).

In some embodiments, data informative of tread depth of the given tire (for a given training sample) can be obtained using other methods described above, or methods including manual methods such as by using a tread depth gauge.

The method further includes feeding (operation 810) the training set to the machine learning module, to train the machine learning module to estimate, based on an image of a tire, tread depth of the tire.

Training of the machine learning module can include determining weighting and/or threshold values of the network, which can be initially selected prior to training, and can be further iteratively adjusted or modified during training to achieve an optimal set of weighting and/or threshold values in the trained machine learning module. After each iteration, a difference can be determined between the actual output produced by the machine learning module (predicted tread depth) and the target output associated with the respective training sample (measured tread depth). The difference can be referred to as an error value. Training can be determined to be complete when a cost function indicative of the error value is less than a predetermined value or when a limited change in performance between iterations is achieved.

If the training set includes training samples each comprising a single image of a tire, then the machine learning module is trained to estimate, based on a single image of a tire, tread depth of the tire.

If the training set includes training samples each comprising at least two images of a tire acquired at different angles, then the machine learning module is trained to estimate, based on two images of a tire acquired at different angles, tread depth of the tire. As mentioned above, the two images of the tire are acquired simultaneously, or with a time offset which can be disregarded.

Figure 9:
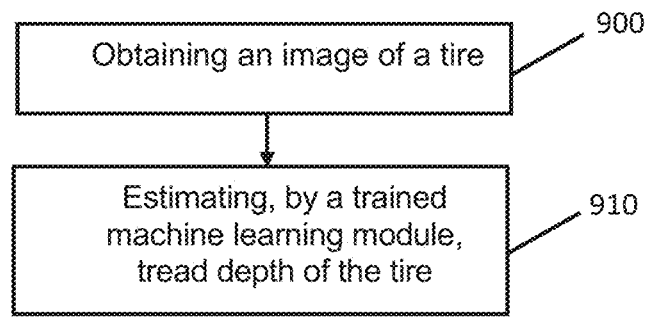
FIG. 9 schematically illustrates a method of estimating, using a machine learning module, tread depth of a tire based on one or more images of the tire.

Attention is now drawn to FIG. 9.

Assume that a machine learning module has been trained, as explained with reference to FIG. 8. A trained machine learning module is therefore available.

The method of FIG. 9 includes obtaining (operation 900) an image of a tire of a vehicle, wherein the image is informative of a tread of the tire. The method further includes estimating/predicting (operation 910), by the trained machine learning module, tread depth of the tire, or data informative thereof.

If the trained machine learning module has been trained based on training samples, each including a single image of a tire, then it is sufficient to obtain a single image of the tire. This single image can be acquired using e.g. the architecture involving of FIG. 2A. This is however not limitative, and other architectures can be used, such as an architecture including an underground imaging device, or other architectures.

Figure 9A:
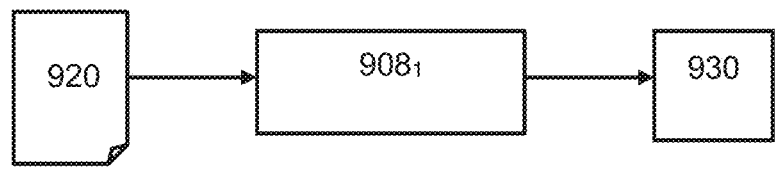
FIG. 9A schematically illustrates an architecture in which a machine leaning module estimates tread depth of a tire based on a single image of the tire.

This is shown in FIG. 9A, in which a single image 920 of a tire is fed to the trained machine learning module $908_1$, which outputs an estimation 930 of tread depth of the tire, or data informative thereof.

If the trained machine learning module has been trained based on training samples, each including two images of a tire, then during usage of the trained machine learning module in a prediction mode (estimation mode), two images are fed to the machine learning module. As mentioned, the two images are generally two images of the tire which are each informative of the tread of the tire and which have been acquired simultaneously, or with a time offset which can be disregarded, and at two different angles. Acquisition of the two images can rely e.g. on the architecture of FIG. 2. This is, however, not limitative, and other architectures can be used (see e.g. above other examples).

Figure 9B:
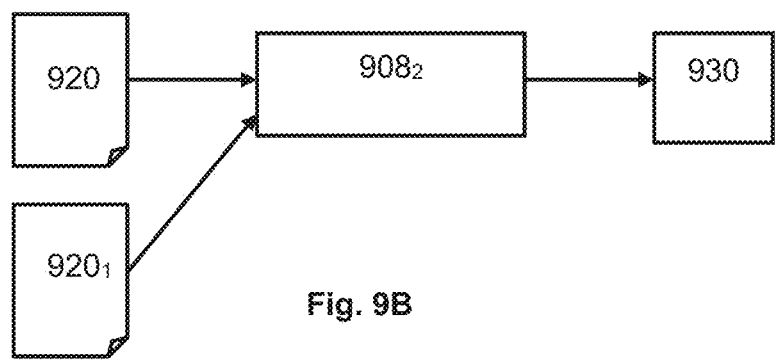
FIG. 9B schematically illustrates an architecture in which a machine learning module estimates tread depth of a tire based on at least two images of the tire.

This is shown in FIG. 9B, in which two images 920, 920 of a tire are fed to the trained machine learning module $908_2$, which outputs an estimation 930 of tread depth of the tire, or data informative thereof.

The invention contemplates a computer program being readable by a computer for executing at least part of one or more methods of the invention. The invention further contemplates a machine-readable memory tangibly embodying a program of instructions executable by the machine for executing at least part of one or more methods of the invention.

It is to be noted that the various features described in the various embodiments can be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A computerized system comprising a processing unit and associated memory configured to:
   obtain a three-dimensional dataset informative of at least part of a tread of a tire, and
   determine at least one surface in the three-dimensional dataset of the tread which is flat according to a criterion,
   determine a local direction orthogonal to the surface,
   generate, for each of a plurality of points of said surface, a corrected height with respect to said local direction, and
   determine data informative of tread depth of the tire using the corrected height generated for each of said plurality of points of said surface.

2. The system of claim 1, configured to:
   obtain at least two images of a tire acquired at different viewing angles, wherein each of the two images is informative of a tread of the tire, and
   generate, using the two images, the three-dimensional dataset informative of at least part of the tread based on the two images.

3. The computerized system according to claim 1, configured to determine data informative of tread depth at various locations around the tread, wherein the locations are spread along a portion of a total circumference of the tread which corresponds to at least 5% of the total circumference of the tread.

4. The computerized system according to claim 1, configured to determine data informative of tread depth at various locations around the tread, wherein the three-dimensional dataset is obtained based on data acquisition of the tread which captures, in a single acquisition, data informative of at least 5% of the total circumference of the tread.

5. The computerized system according to claim 1, configured to determine, for at least one groove of the tread, data informative of tread depth for at least 100 different locations along a bottom of the groove.

6. The computerized system according to claim 1, wherein:
   the three-dimensional dataset comprises a plurality of points, wherein at least some of the plurality of points have a position in the three-dimensional dataset which depends on at least one of:
   (1) a viewing angle of the tread by a device, and
   (2) a curvature of the tread, wherein the computerized system is configured to generate a corrected height for at least some of the plurality of points which is independent of at least one of (1) and (2) according to a criterion.

7. The computerized system according to claim 1, configured to:
generate, using the three-dimensional dataset, a map informative of height profile of at least part of the tread, and
determine, using the map, data informative of tread depth of the tire.

8. The computerized system according to claim 7, wherein at least one groove present in the tread, which is represented as a curved portion in the three-dimensional dataset, is represented as a straight portion in the map.

9. The computerized system according to claim 7, wherein generating the map includes unwrapping the three-dimensional dataset, or data informative thereof.

10. The computerized system according to claim 7, configured to:
project at least part of the three-dimensional dataset along a predefined axis, and
fit a predefined shape to a representation of the tread in the three-dimensional dataset.

11. The computerized system according to claim 10, wherein the predefined shape includes:
a cylinder, or
a toroid.

12. The computerized system according to claim 1, configured to:
obtain a training set comprising, for each training sample of the training set, an image of a tire and data informative of tread depth of the tire, and
feed the training set to a machine learning module, to train the machine learning module to estimate, based on an image of a tire, tread depth of the tire.

13. The computerized system according to claim 12, wherein each training sample comprises a single image of a tire and data informative of tread depth of the tire.

14. The computerized system according to claim 12, configured to obtain a single image of a given tire and to estimate, using the machine learning module after its training, tread depth of the given tire.

15. The computerized system according to claim 1, wherein at least one image used to generate the three-dimensional dataset is acquired by an imaging device from a first angle relative to a longitudinal direction perpendicular to a surface of the tread, and wherein the tire is illuminated by an illumination device from a second angle relative to the horizontal direction, wherein the illumination device and the imaging device are positioned so as to have the first angle being smaller than the second angle.

16. A computerized system comprising a processing unit and associated memory configured to:
obtain a training set including a plurality of training samples, wherein each given training sample of the training set comprises at least one image of a given tire, and data informative of tread depth of the given tire, and
feed the training set to a machine learning module, to train the machine learning module to estimate, based on an image of a tire, tread depth of the tire.

17. The computerized system according to claim 16, wherein at least one of (i) and (ii) is met:

(i) a given training sample of the training set comprises at least two images of a given tire acquired at different angles and data informative of tread depth of the given tire, wherein each of the two images is informative of a tread of the given tire, wherein the computerized system is configured to feed the training set to the machine learning module, to train the machine learning module to estimate, based on an at least two images of a tire acquired at different angles, tread depth of the tire;
(ii) at least one given training sample of the training set comprises a single image of a given tire and data informative of tread depth of the given tire, wherein the computerized system is configured to feed the training set to the machine learning module, to train the machine learning module to estimate, based on a single image of a tire acquired at different angles, tread depth of the tire.

18. The computerized system according to claim 16, wherein, for at least one given training sample associated with a given tire, determination of data informative of tread depth of the given tire comprises:
obtaining a three-dimensional dataset informative of at least part of a tread of a tire, and
determining, using the three-dimensional dataset, data informative of tread depth of the tire.

19. The computerized system according to claim 16, configured to obtain a single image of a tire and to estimate, using the machine learning module after its training, tread depth of the tire.

20. A computerized system comprising a processing unit and associated memory configured to:
obtain at least one image of a tire, wherein the at least one image is informative of a tread of the tire,
feed the at least one image to a trained machine learning module, and
estimate, using the machine learning module, tread depth of the tire.

21. The computerized system according to claim 20, wherein the image is a single image of the tire.

22. A computerized system comprising a processing unit and associated memory configured to:
obtain a three-dimensional dataset informative of at least part of a tread of a tire, and
determine at least one surface in the three-dimensional dataset of the tread which is flat according to a criterion,
wherein at least one image used to generate the three-dimensional dataset is acquired by an imaging device from a first angle relative to a longitudinal direction perpendicular to a surface of the tread, and wherein the tire is illuminated by an illumination device from a second angle relative to the horizontal direction, wherein the illumination device and the imaging device are positioned so as to have the first angle being smaller than the second angle.

23. The computerized system of claim 22, configured to obtain at least two images of the tire acquired at different viewing angles, wherein each of the two images is informative of a tread of the tire, and generate, using the two images, the three-dimensional dataset informative of at least part of the tread based on the two images.

* * * * *